US011366876B2

(12) United States Patent
Wu et al.

(10) Patent No.: US 11,366,876 B2
(45) Date of Patent: Jun. 21, 2022

(54) EIGENVALUE DECOMPOSITION WITH STOCHASTIC OPTIMIZATION

(71) Applicant: INTERNATIONAL BUSINESS MACHINES CORPORATION, Armonk, NY (US)

(72) Inventors: Chai Wah Wu, Hopewell Junction, NY (US); Oguzhan Murat Onen, Boston, MA (US); Tayfun Gokmen, Briarcliff Manor, NY (US); Malte Johannes Rasch, Chappaqua, NY (US); Mark S. Squillante, Greenwich, CT (US); Tomasz J. Nowicki, Fort Montgomery, NY (US); Wilfried Haensch, Somers, NY (US); Lior Horesh, North Salem, NY (US); Vasileios Kalantzis, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

(21) Appl. No.: 16/910,975

(22) Filed: Jun. 24, 2020

(65) Prior Publication Data

US 2021/0406338 A1    Dec. 30, 2021

(51) Int. Cl.
*G06F 17/16* (2006.01)
*G06F 7/78* (2006.01)

(52) U.S. Cl.
CPC .............. *G06F 17/16* (2013.01); *G06F 7/78* (2013.01)

(58) Field of Classification Search
CPC . G06F 17/11; G06F 17/16; G06F 7/78; G06N 3/08; G06N 3/084
See application file for complete search history.

(56) References Cited

U.S. PATENT DOCUMENTS 9,152,827 B2    10/2015    Linderman et al.
9,646,243 B1    5/2017    Gokmen
(Continued)

FOREIGN PATENT DOCUMENTS

CN    103744061    4/2014

OTHER PUBLICATIONS

Hoskins et al. on "Streaming Batch Eigenupdates for Hardware Neural Networks" in Froniers in Neuroscience Aug. 2019. Retrieved from <https://doi.org/10.3389/fnins.2019.00793> (Year: 2019).*
(Continued)

*Primary Examiner* — Emily E Larocque
*Assistant Examiner* — Carlo Waje
(74) *Attorney, Agent, or Firm* — Tutunjian & Bitetto, P.C.; Randall Bluestone

(57) ABSTRACT

A computer-implemented method for Eigenpair computation is provided. The method includes computing, her a hardware processor, an Eigenvector and respective Eigenvalues of the Eigenvector of a matrix by using a modified Stochastic Optimization process including performing a matrix vector product on a Resistive Processing Unit (RPU) crossbar array operatively coupled to the hardware processor and performing a scalar vector product on a digital device operatively coupled to the hardware processor and representing, for each of an Eigenpair, an initial guess for the Eigenvector and the respective Eigenvalues. The computing step includes storing the matrix in the RPU crossbar array.

25 Claims, 7 Drawing Sheets

(56) References Cited

U.S. PATENT DOCUMENTS

| | | | |
|---|---|---|---|
| 9,715,676 B2 | 7/2017 | Bahar | |
| 10,410,716 B2 | 9/2019 | Hu et al. | |
| 11,216,184 B2* | 1/2022 | Choi | G06N 3/08 |
| 2005/0021577 A1 | 1/2005 | Prabhu et al. | |
| 2010/0185716 A1* | 7/2010 | Nakamura | G06F 17/16 |
| | | | 708/650 |
| 2017/0109626 A1 | 4/2017 | Gokmen et al. | |
| 2018/0300627 A1 | 10/2018 | Gokmen et al. | |
| 2019/0318239 A1* | 10/2019 | Kim | G06N 3/084 |
| 2020/0233922 A1* | 7/2020 | Ielmini | G11C 13/0002 |
| 2020/0279169 A1* | 9/2020 | Hoskins | G06N 3/0635 |

OTHER PUBLICATIONS

S. Liu, Y. Wang, M. Fardad and P. K. Varshney, "A Memristor-Based Optimization Framework for Artificial Intelligence Applications," in IEEE Circuits and Systems Magazine, vol. 18, No. 1, pp. 29-44, Firstquarter 2018, doi: 10.1109/MCAS.2017.2785421. (Year: 2018).*

C. Wang, Z. S. Jalali, C. Ding, Y. Wang and S. Soundarajan, "A Fast and Effective Memristor-Based Method for Finding Approximate Eigenvalues and Eigenvectors of Non-negative Matrices," 2018 IEEE Computer Society Annual Symposium on VLSI (ISVLSI), 2018, pp. 563-568, doi: 10.1109/ISVLSI.2018.00108. (Year: 2018).*

Strang on "Symmetric matrices and positive definiteness" Lectue Notes. Retrieved from <https://ocw.mit.edu/courses/mathematics/18-06sc-linear-algebra-fall-2011/positive-definite-matrices-and-applications/symmetric-matrices-and-positive-definiteness/MIT18_06SCF11_Ses3.1sum.pdf> (Year: 2011).*

Chen on "Singular Value Decomposition" Lecture notes. Retrieved from <http://www.math.tau.ac.il/~turkel/notes/SVD.pdf (Year: 2018).*

Assaf et al., "Vector Matrix Multiplication Using Crossbar Arrays: A Comparative Analysis", 2018 25th IEEE International Conference on Electronics Circuits and Systems, ICECS 2018 (Jan. 17, 2019): 609-612.

Wikipedia, "Stochastic Gradient Descent", available at: https://en.wikipedia.org/wiki/Stochastic_gradient_descent, last downloaded Feb. 5, 2020, 14 pages.

Wikipedia, "Eigendecomposition of a Matric", available at: https://en.wikipedia.org/wiki/gendecomposition_of_a_matrix, downloaded Feb. 5, 2020, 15 pages.

Mell et al. "The NIST Definition of Cloud Computing", NIST Special Publication 800-145, 2011, 7 pages.

* cited by examiner

EIGENVALUE DECOMPOSITION WITH STOCHASTIC OPTIMIZATION

BACKGROUND

The present invention generally relates to artificial intelligence, and more particularly to Eigenvalue decomposition with Stochastic Optimization with analog crossbar hardware.

Stochastic Optimization are a class of iterative methods for optimizing an objective function with suitable smoothness properties (e.g., differentiable or subdifferentiable). Stochastic Gradient Descent (SGD) can be regarded as a stochastic approximation of gradient descent optimization, since it replaces the actual gradient (calculated from the entire data set) by an estimate thereof (calculated from a randomly selected subset of the data). Especially in big data applications this reduces the computational burden, achieving faster iterations in trade for a slightly lower convergence rate.

SUMMARY

According to aspects of the present invention, a computer-implemented method for Eigenpair computation is provided. The method includes computing an Eigenvector and respective Eigenvalues of the Eigenvector by using a Stochastic Optimization process. The computing step includes storing the matrix in a Resistive Processing Unit (RPU) crossbar array.

According to other aspects of the present invention, a system for Eigenpair computation is provided. The system includes a Resistive Processing Unit (RPU) crossbar array configured to store a matrix of values. The system further includes a hardware processor configured to compute parameters of the matrix by computing an Eigenvector and respective Eigenvalues of the Eigenvector by using a Stochastic Optimization process.

According to further aspects of the present invention, a system for Eigenpair computation is provided. The system includes a Resistive Processing Unit (RPU) crossbar array configured to store a matrix of values. The system also includes a hardware processor configured to compute parameters of the matrix by representing, on a digital device, for each of an Eigenpair, an initial guess for an Eigenvector and respective Eigenvalues of the Eigenvector. The hardware processor is further configured to perform a modified Stochastic Optimization process by performing a matrix vector product on the RPU crossbar array and performing a scalar vector product on the digital device. The Stochastic Optimization process converges responsive to a particular number of Eigenpairs being found by the Stochastic Optimization process. Subsequent Eigenpairs are obtained by subtracting, from the matrix in an analog outer product update operation, an outer product of a last found Eigenvector in a set of epochs, a transposition of the last found Eigenvector, and a last found Eigenvalue in the set of epochs.

According to still further aspects of the present invention, a method for Eigenpair computation is provided. The method includes configuring a Resistive Processing Unit (RPU) crossbar array to store a matrix of values. The method further includes configuring a hardware processor to compute parameters of the matrix by representing, on a digital device, for each of an Eigenpair, an initial guess for an Eigenvector and respective Eigenvalues of the Eigenvector. The method also includes configuring the hardware processor compute parameters of the matrix further by performing a modified Stochastic Optimization process by performing a matrix vector product on the RPU crossbar array and performing a scalar vector product on the digital device. The Stochastic Optimization process converges responsive to a particular number of Eigenpairs being found by the Stochastic Optimization process. Subsequent Eigenpairs are obtained by subtracting, from the matrix in an analog outer product update operation, an outer product of a last found Eigenvector in a set of epochs, a transposition of the last found Eigenvector, and a last found Eigenvalue in the set of epochs.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to Eigenvalue decomposition with Stochastic Optimization with analog crossbar hardware.

In one or more embodiments of the present invention, an approach is provided that computes Eigenvalues/Eigenvectors of a matrix using a Stochastic Optimization such as, for example, stochastic gradient descent, where the matrix is stored on a resistive crossbar array.

In one or more embodiment, Eigenvalues are found using Stochastic Optimization (which includes a myriad of methods, such as stochastic approximation, stochastic gradient descent, scenario optimization, and so forth). For the sake of illustration, one or more embodiments described herein use Stochastic Gradient Descent (SGD) for the sake of illustration. However, as noted, any Stochastic Optimization can be used to find Eigenvalues in accordance with the present principles.

Conventional Eigenvalue decomposition with conventional digital processors are computationally expensive. Instead, in an embodiment of the present invention, the problem is reconfigured as a iterative process with a high number of vector matrix multiplications which are very fast to perform with crossbar arrays. The disadvantage of the method is that the computed Eigenvectors may not be as precise as desired, which is the reason why the method is combined with digital post-processing at the end.

In one or more embodiments of the present invention, an approach is provided that stores a matrix in a resistive crossbar array and computes the Eigenvalues/Eigenvectors of the matrix.

Figure 1:
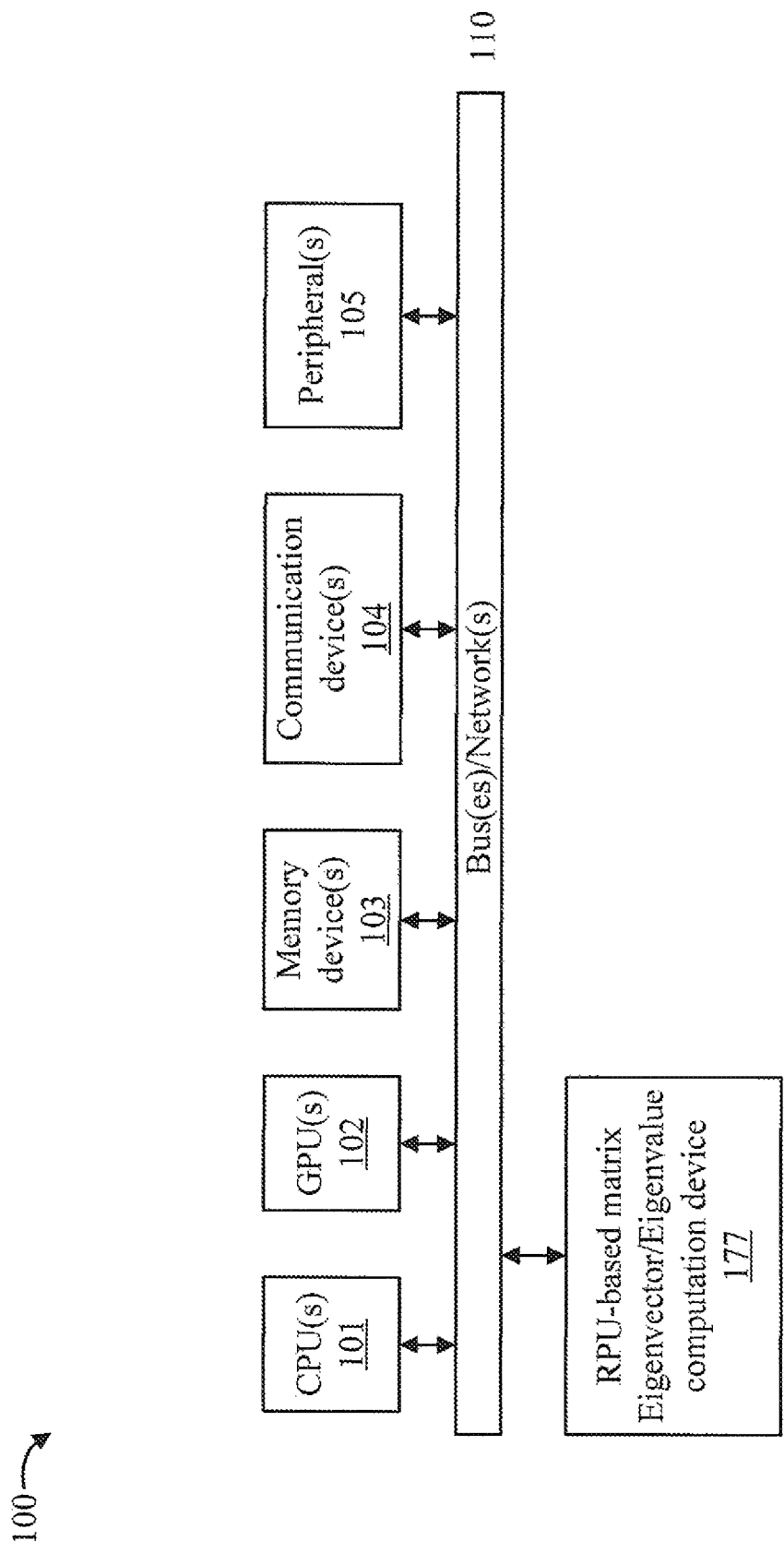
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, set of peripherals 105, and a RPU-based matrix Eigenvector/Eigenvalue computation device 177 (see FIG. 8). The RPU-based matrix Eigenvector/Eigenvalue computation device 177 performs Eigenvector decomposition with Stochastic Gradient Descent using analog (RPU) crossbar hardware. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, PLAs, hardware switches, and/or logic elements.

Such hardware processor can be used to perform Eigenvalue decomposition with stochastic gradient descent using analog crossbar hardware (e.g., RPUs).

These and other variations of a hardware processor subsystem are also contemplated in accordance with embodiments of the present invention.

Updates involving multiplication and addition is difficult to implement for Resistive Processing Units (RPUs). Addition is easy to implement, but multiplication may require sophisticated hardware elements such as arithmetic logic unit (ALU) and/or floating point unit (FPU). Each RPU may take much larger space because of these sophisticated hardware elements.

The present invention performs Eigenvalue decomposition with stochastic gradient descent using analog (RPU) crossbar hardware. In this way, the use of sophisticated hardware elements is avoided.

As used herein, the term "Eigenpair" refers to the mathematical pair of an Eigenvector x and its associated Eigenvalue(s) k.

Figure 2:
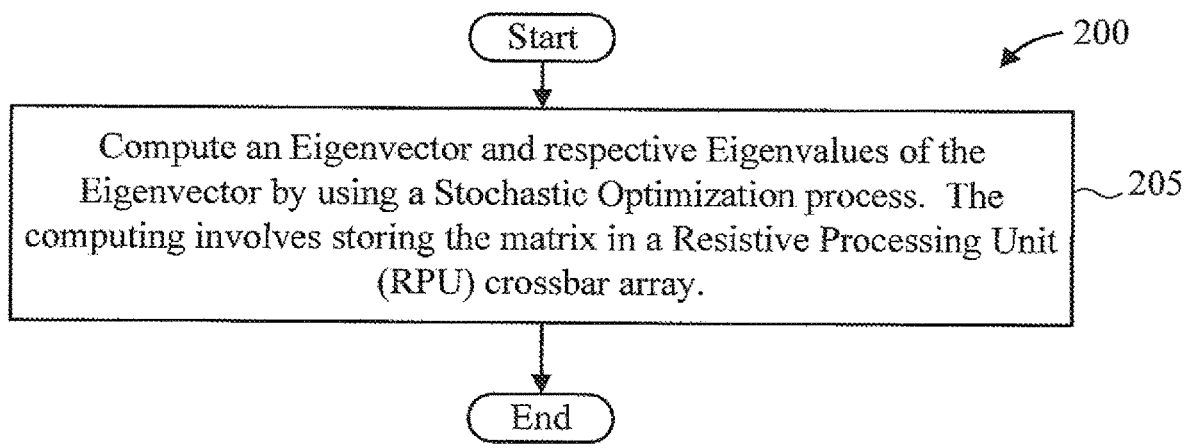
FIG. 2 is a flow diagram showing an exemplary method for Eigenvalue decomposition with stochastic gradient descent using analog crossbar hardware, in accordance with an embodiment of the present invention.

FIG. 2 is a flow diagram showing an exemplary method 200 for Eigenvalue decomposition with stochastic gradient descent using analog crossbar hardware, in accordance with an embodiment of the present invention.

At block 205, compute an Eigenvector and respective Eigenvalues of the Eigenvector by using a Stochastic Optimization process. The computing involves storing the matrix in a Resistive Processing Unit (RPU) crossbar array.

Figure 3:
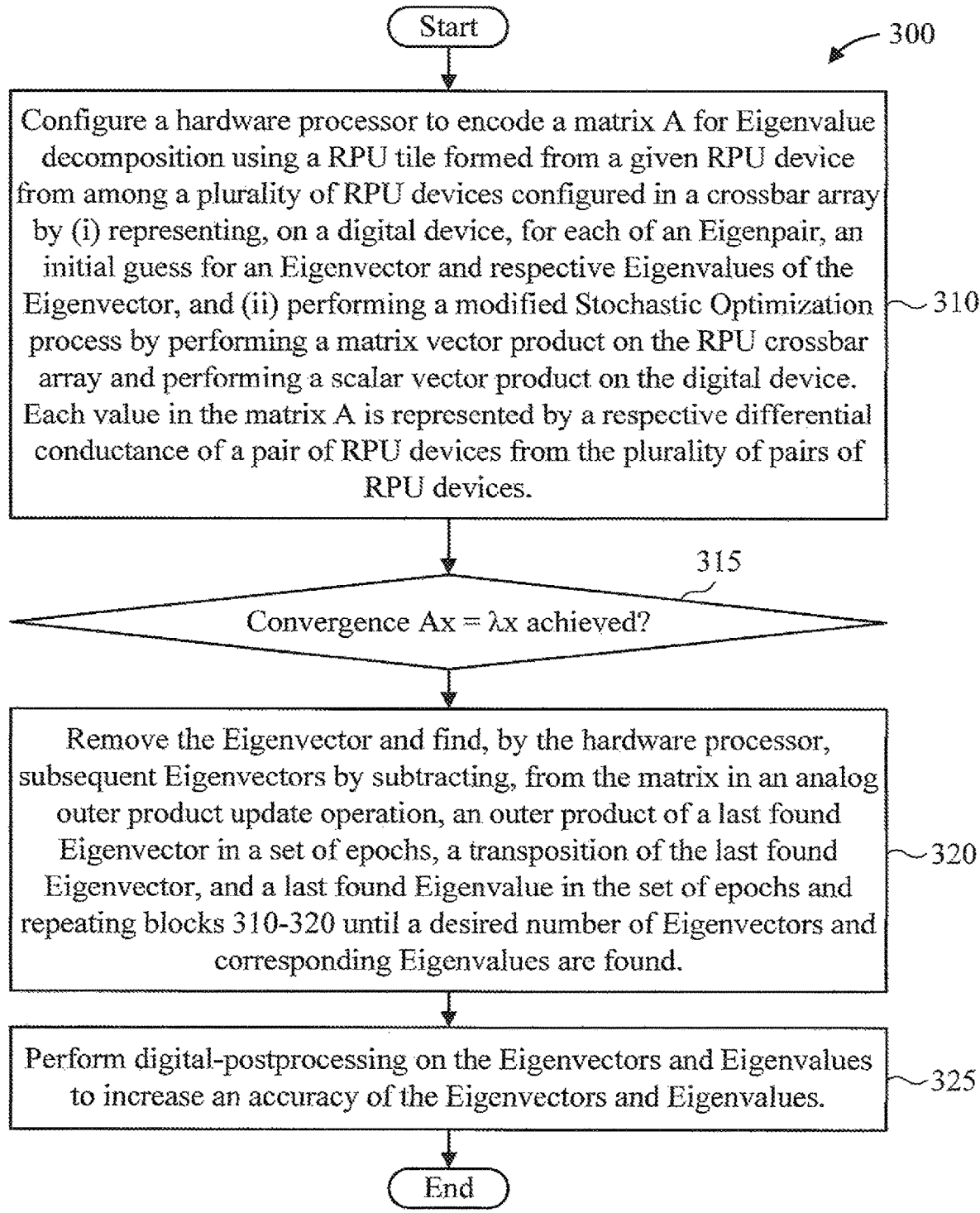
FIG. 3 is a flow diagram showing another exemplary method for Eigenvalue decomposition with stochastic gradient descent using analog crossbar hardware, in accordance with an embodiment of the present invention.

FIG. 3 is a flow diagram showing another exemplary method 300 for Eigenvalue decomposition with stochastic gradient descent using analog crossbar hardware, in accordance with an embodiment of the present invention.

The method performs eigenvector decomposition for a given matrix, one Eigenpair at a time. Thus, only a single RPU can be used to store this matrix, such that many fast forward passes (vector matrix multiplication) can be performed and those outputs used to update initial Eigenvector (x) and Eigenvalue (l) guesses, iteratively. Once a pair is found, then the pair is removed from the initial matrix such that they are not re-found again. That is when the RPU is "updated", in order to subtract $xlx^T$ from the stored matrix.

These "updates" are performed as many times as the size of the matrix (unless for some reason you only need a couple of them) and nothing should be left in the RPU once done (and all the Eigenpairs have been found, presumably stored somewhere in digital form).

At block 310, configure a hardware processor to encode a matrix A for Eigenvalue decomposition using a Resistive Processing Unit (RPU) tile formed from a given RPU device from among a plurality of RPU devices configured in a crossbar array by (i) representing, on a digital device, for each of an Eigenpair, an initial guess for an Eigenvector and respective Eigenvalues of the Eigenvector, and (ii) performing a modified Stochastic Optimization process by performing a matrix vector product on the RPU crossbar array and performing a scalar vector product on the digital device. Each of the values in the matrix A is represented by a respective differential conductance of a pair of RPU devices from the plurality of pairs of RPU devices. The Stochastic Optimization process converges responsive to a particular number of Eigenpairs being found by the Stochastic Optimization process.

In an embodiment, the matrix A can be a symmetric positive definite matrix. In an embodiment, the Stochastic Optimization process can be performed over a problem $Ax-\lambda x=0$, where A denotes the matrix stored in the RPU, x denotes the Eigenvector, and $\lambda$ denotes the Eigenvalues.

In an embodiment, the matrix A can be a non-symmetric indefinite matrix. In an embodiment, the Stochastic Optimization process can be performed over a problem $A^T A$, where $A^T$ denotes a transpose of the matrix, and A denotes the matrix.

At block 315, determine if convergence, $Ax=\lambda x$, has been achieved. If so, then proceed to block 320. Otherwise, return to block 310.

At block 320, remove the Eigenvector and find, by the hardware processor, subsequent Eigenvectors by subtracting, from the matrix in an analog outer product update operation, an outer product of a last found Eigenvector in a set of epochs, a transposition of the last found Eigenvector, and a last found Eigenvalue in the set of epochs and repeating blocks 310-320 until a desired number of Eigenvectors and corresponding Eigenvalues are found. Thus, in block 320, the operation $A \leftarrow A - x\lambda x^T$ is performed, which is a rank-one change that can be written with a stochastic update scheme (in DNN notation this can be represented as follows: $x=x$ and $\delta=\lambda x$). Block 320 relies upon a definition of an error function of a Stochastic Optimization process as a difference between Ax and $\lambda x$. Since x is an Eigenvector and 1 is its' Eigenvalue, $Ax-\lambda x=0$.

The steps delineated for encoding the matrix are repeated until the particular number of Eigenpairs is found by the Stochastic Optimization process.

At block 325, perform digital-postprocessing on the Eigenvectors and Eigenvalues to increase an accuracy of the Eigenvectors and Eigenvalues. Essentially, the result obtained from the analog architecture is fast but a little inaccurate. However, fine-tuning it requires rather cheap operations in the digital domain as it resembles an iterative method with a super-good initial guess.

Two exemplary digital-postprocessing approaches are described for the sake of illustration. The first one is quite fast (very few iterations) but requires finding Eigenvectors in order (from the largest Eigenvalue to the lowest). It essentially involves taking the output of an analog operation x (scalar 1 not needed), and multiplying with the digital copy of A such that y=Aj. Then, the same is done with k to get 1=Ak, and so on. In enough iterations, the output should become the Eigenvector (x) with the largest Eigenvalue ($\lambda$). Eigenvalue can be computed from the last iteration since $x^*A=\lambda^*x$. Since x should be close to v already, few iterations should suffice.

Second one would be relatively slower but the ordering does not matter as an advantage. It is basically doing the same operations you do with the RPU in analog domain, but in digital. Again, it is presumed that only a few iterations should suffice.

Figure 4:
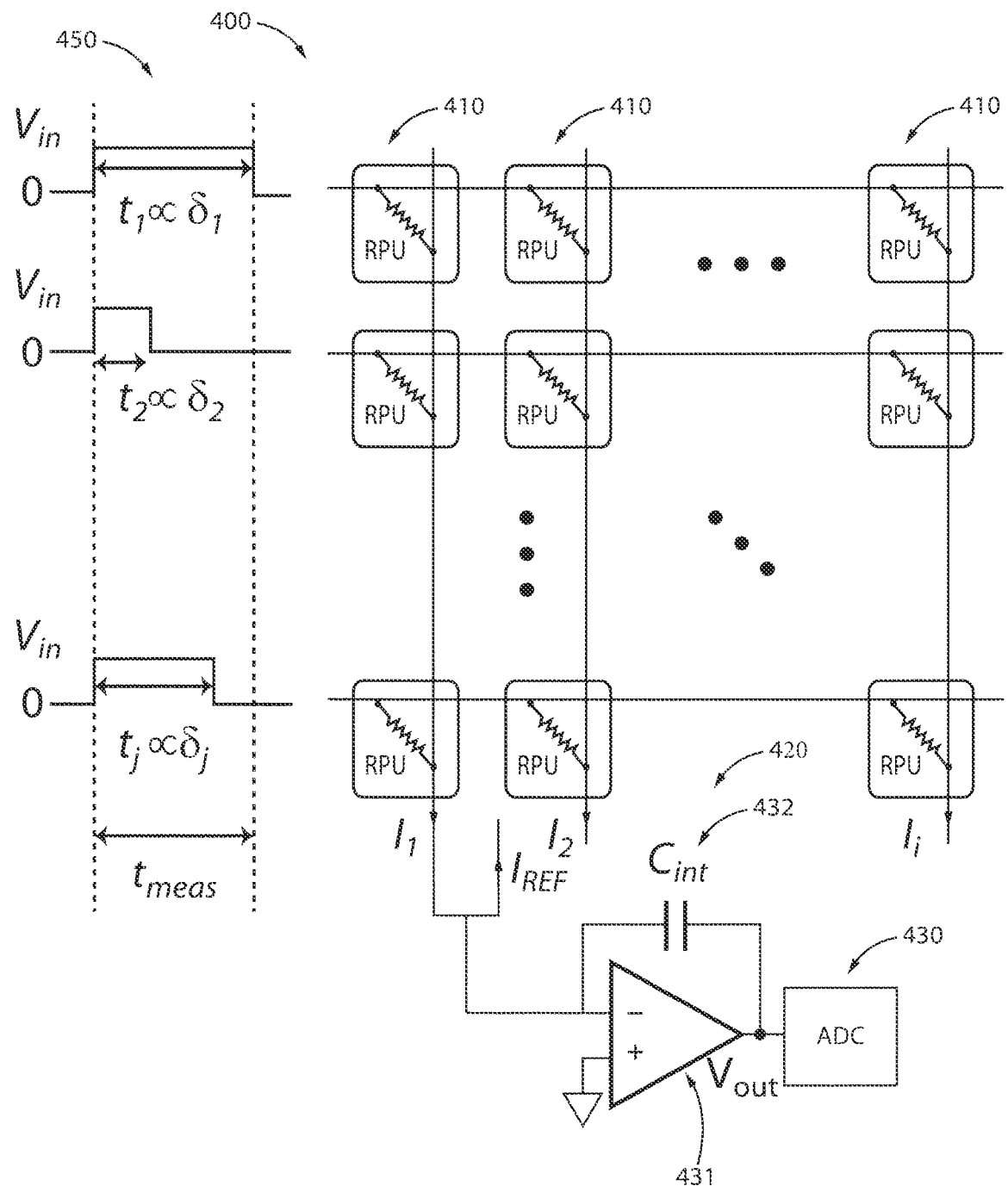
FIG. 4 is a block diagram showing an exemplary RPU-based analog architecture and corresponding signals, in accordance with an embodiment of the present invention.
Figure 5:
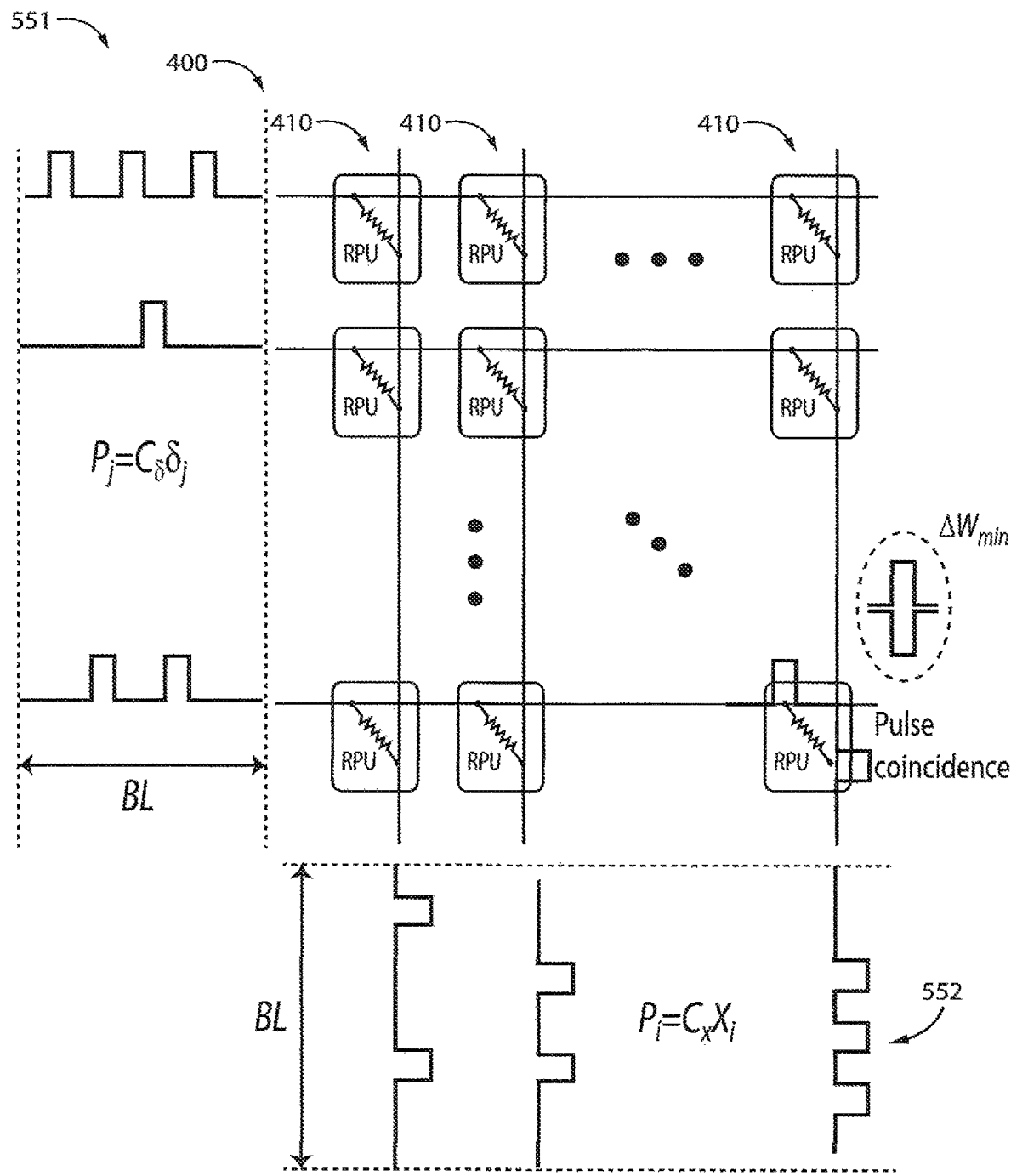
FIG. 5 is a block diagram showing a portion of the exemplary RPU-based analog architecture of FIG. 4. and corresponding sets of training phase signals and, in accordance with an embodiment of the present invention.

In relation to FIGS. 4 and 5, pulsing schemes are shown that enable a stochastic update rule for a RPU according to embodiments of the present invention. The voltage pulses with positive and negative amplitudes are sent from corresponding rows and columns, respectively. Translated stochastic numbers are represented by a whole population of these pulses. In order for a two-terminal RPU device to distinguish pulse coincidence events at a cross-point, its conductance value should not change significantly when a single pulse V in/2 is applied to a device from a row or a column. However, when two pulses coincide and the RPU device sees the full voltage (Vin) the conductance should change by nonzero amount $\Delta g_{min}$. The parameter $\Delta g_{min}$ is proportional to $\Delta w_{min}$ through the amplification factor defined by neuron circuitry. To enable both up and down changes in conductance the polarity of the pulses can be switched during the update cycle.

FIG. 4 is a block diagram showing an exemplary RPU-based analog architecture 400 and corresponding test phase signals 450, in accordance with an embodiment of the present invention.

The architecture includes an array of RPU cells 410 having inputs connected to neurons $\delta_1$ through $\delta_j$ row-wise and to an integrator 420 column-wise, where there are total of j rows and i columns. The integrator 420 is formed from an operation amplifier 431 having one input connected to one end of a capacitor 432, an output connected to the other end of the capacitor 432, and the other input connected to a reference potential (e.g., ground). Each column provides a digital voltage (pulses) from a neuron while each row provides a respective analog current to be integrated, from $1_1$ through $1_i$, for row 1 through row i, respectively. The output of the integrator 420 is connected to an Analog-to-Digital-Converter (ADC) 430 for conversion to a digital value.

Row 1 receives a pulse of $t_1 \alpha \delta_1$, row 2 receives a pulse of $t_2 \alpha \delta_2$, and so on up to row j receives a pulse of $t_j \alpha \delta_j$.

Further regarding the forward pass signals (pulses) 450, they are mostly constant amplitude pulses, that the polarity is determined by the sign of the input and duration is determined by the absolute value of the input (i.e. time encoded). In other embodiments, amplitude-encoding can be performed. These pulses are often assumed to have a maximum duration of 100 ns in general.

Each row provides a respective current that is summed with a reference current as an input to the integrator 420.

The following definitions apply: A denotes a matrix; x denotes an Eigenvector; and $A^T$ denotes the transpose of the matrix A. Matrix vector multiplication for Ax, $A^T x$, xA, $AxA^T$ are all O(1). For complex matrices, two cells realize the real and imaginary parts separately which makes A* and $A^\dagger$ readily available.

FIG. 5 is a block diagram showing a portion of the exemplary RPU-based analog architecture 400 of FIG. 4 and corresponding sets of signals 551 and 552, in accordance with an embodiment of the present invention.

$P_j = C_\delta \delta_j$, where $P_j$ denotes a pulse amplitude at the j-th column, $C_\delta$ denotes a gain factor for an input neuron, and $\delta_j$ denotes a j-th input neuron.

$P_i = C_x x_i$, where $P_i$ denotes a pulse amplitude at the i-th row, $C_x$ denotes a gain factor for an Eigenvalue, and $x_i$ denotes an i-th Eigenvector.

BL denotes the length of the stochastic bitstreams having stochastic pulses.

Further regarding the signals (pulses) 551, the stochastic update scheme essentially is a method to update the entire crossbar array at once. First, one should assume that following are correct for each cross point element:

The conductance value will change if the absolute value of the programming voltage is greater than a threshold.

$$\text{Example:} V_{prog} > 2V, \Delta G = 1\mu S$$

$$-2V < V_{prog} < 2V, \Delta G = 0$$

$$V_{prog} < -2V, \Delta G = -1\mu S$$

In the crossbars such as those shown in FIGS. 4 and 5, $V_{prog}$ is essentially the voltage difference across each element. Thus, for example for the device $G_{i,j}$ if 1V is applied from the row i and −1V from column j then the device will have 2V across it and its conductance goes up. Now, if is presumed that from rows one can either force 1V or GND while for columns using only GND or −1V, it can be seen that only for the 1V, −1V condition there is any conductance change (hence the name coincidence detection). It can be seen why every element in the array can be modulated at the same time since when the voltages from the rows and columns are set, the voltage difference instantly appears across each element.

However, rank update cannot be performed using this method. Indeed, the ones that can be made are rank-1 updates: which can be written as x×δ (outer product), corresponding to a matrix with entries $$\begin{matrix} x_1\delta_1 & x_1\delta_2 \\ x_2\delta_1 & x_2\delta_2 \end{matrix}$$

for the 2×2 case. Furthermore, it is not desirable to compute these elements by multiplying either. Then, first, any number (x, δ) is translated to a stochastic bit stream such that probability of having a "HIGH" bit is proportional to the value itself. For example, following the method above, if $x_1$ is 2 and say the maximum x would be 5 then for 40% 1V is provided whereas for the remaining 60% GND is forced, and so on. Then, the thresholding behavior mentioned above essentially means an AND operation (coincidence of both pulses is necessary for any change to occur). Co-occurrence of two probabilistic events has the probability of their individual probabilities compounded, which provides the multiplication part for the x×δ. Furthermore, this does not need to be added to the matrix, since the conductance values are already modified with this method. As a result, rank-one updates can be performed in parallel and without even explicitly computing any multiplications or additions.

Further regarding the signals (pulses) 552, these signals are similar to signals 551. The only difference is that the input that is translated to stochastic bit stream for 451 is −x whereas that for 452 is λx since you want to perform the rank-one update $-x\lambda x^T$. For DNNs there is often a learning rate η, which is not the case here (or η=1).

If the matrix that is trained on is analog as is the case here, then the update of the matrix via outer products have O(1) computational complexity.

A description will now be given regarding practical implementations, in accordance with various embodiments of the present invention.

Practically any algorithmic routine runs some set of numerical linear algebra operations such as dot products, various matrix decompositions and linear system solving. These are currently handled by a set of low-level subroutines called BLAS (Basic Linear Algebra Subprograms) which can be thought as the backbone of any practical operation. Moreover, Eigendecompositions, linear system solvers, and so forth are currently handled by a subroutines called Linear Algebra PACKage (LAPACK). One or more embodiments of the present invention are directed to creating an "analog "BLAS", an "analog LAPACK", a hybrid "BLAS" and/or a "hybrid LAPACK" such that computation of these key operations can be accelerated due to the parallelism of the analog crossbar architectures (RPU). These architectures' massive potential as deep learning accelerators is noted. Novel methods are explored to further expand this concept with respect to general linear algebra problems. This disclosure is designed to achieve this goal.

Matrix decompositions in general are often performed as a preconditioning step such that a more involved matrix operation can be computed with reduced complexity. An example algorithm that implements Eigendecomposition is principal component analysis (PCA), which is heavily used in machine learning for reducing the dimensionality of the dataset. In this way, efficient learning of an immense data set so reduced can be performed. Performing the Eigendecomposition process in analog domain (instead of digital) could significantly reduce the time and energy costs to handle the computational workload and therefore enable the processing of much more complex operations within the computational budget. The invention describes a method to exploit the advantageous principles of analog computing as well as providing mitigation techniques to their shortcomings.

Another application to which the present invention can be applied is network centralities where one determines the importance of each node using information obtained by a full eigenvalue decomposition using the present invention. Real-world examples include the identification of the most influential person(s) in a social network, or the most important nodes to direct traffic to/from in roadmap networks.

It is further noted that Eigenvalues are used extensively in computational geometry (Betti numbers in topological data analysis, Isomaps in manifold learning, etc.), graph analysis (Eigenvalues of graph Laplacian or boundary maps), computational chemistry (ground and excited states computation, moments, forces, etc.), stability analysis of dynamical systems, and many more applications as readily appreciated by one of ordinary skill in the art given the teachings of the present invention provide herein.

In the context of cloud computing, future hybrid cloud offerings can be formulated, in which multiple computational substrates are considered, digital processing units (CPUs, GPUs, ASIC, FPGA) alongside analog processing units (such as resistor arrays). Computations that fit the analog paradigm will be performed on analog devices, whereas those who do not will run on digital. Also, of course, in between symbiotic computations, involving both analog and digital operating in concert, will offer maximal utility of the system as whole. Such computations can be provided as a PAAS, IAAS, and/or SAAS for purposes such as sales monitoring, advertising rollout, computing system management and control (as described above), and so forth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
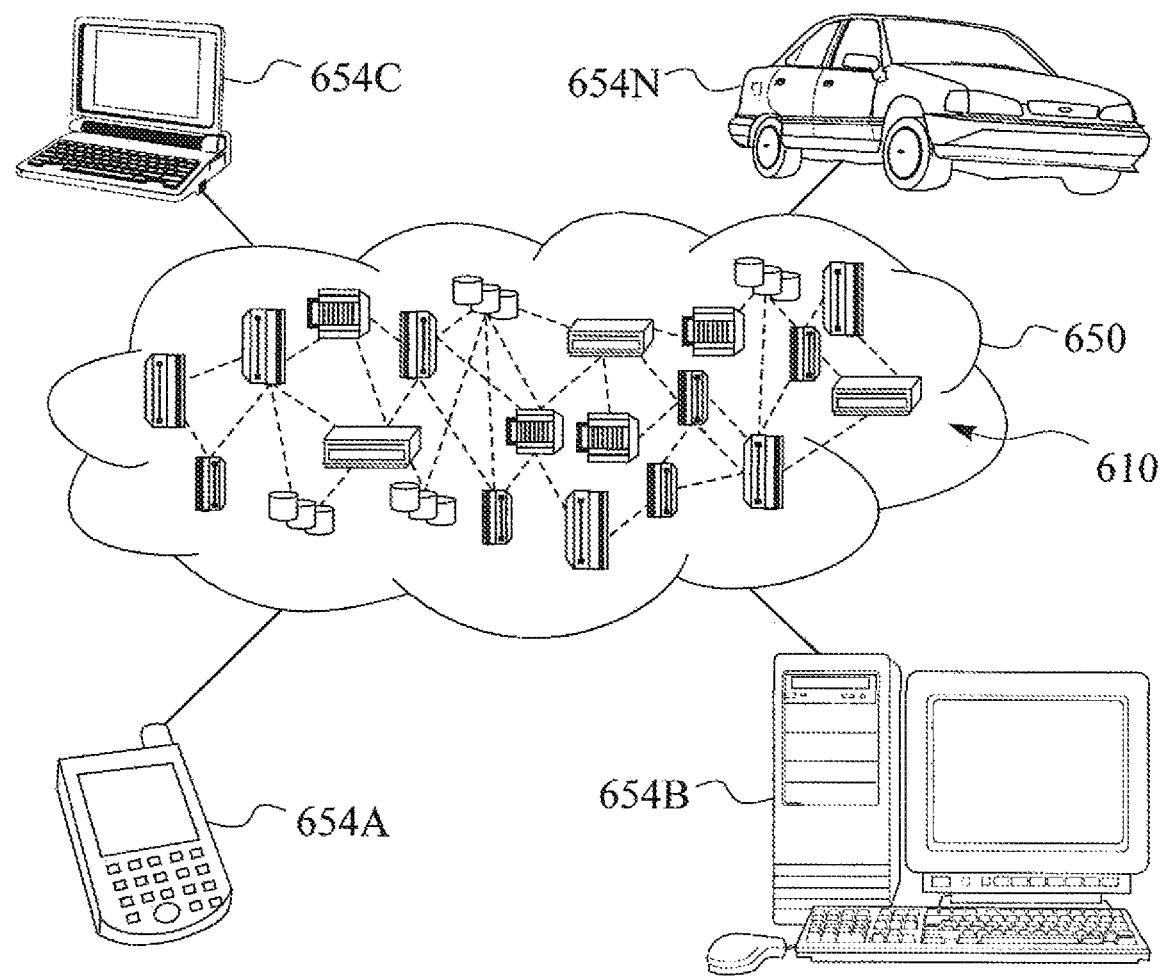
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 750 can communicate with any type of computerized device over any type of network and/or network addressable connection (e.g., using a web browser).

Figure 7:
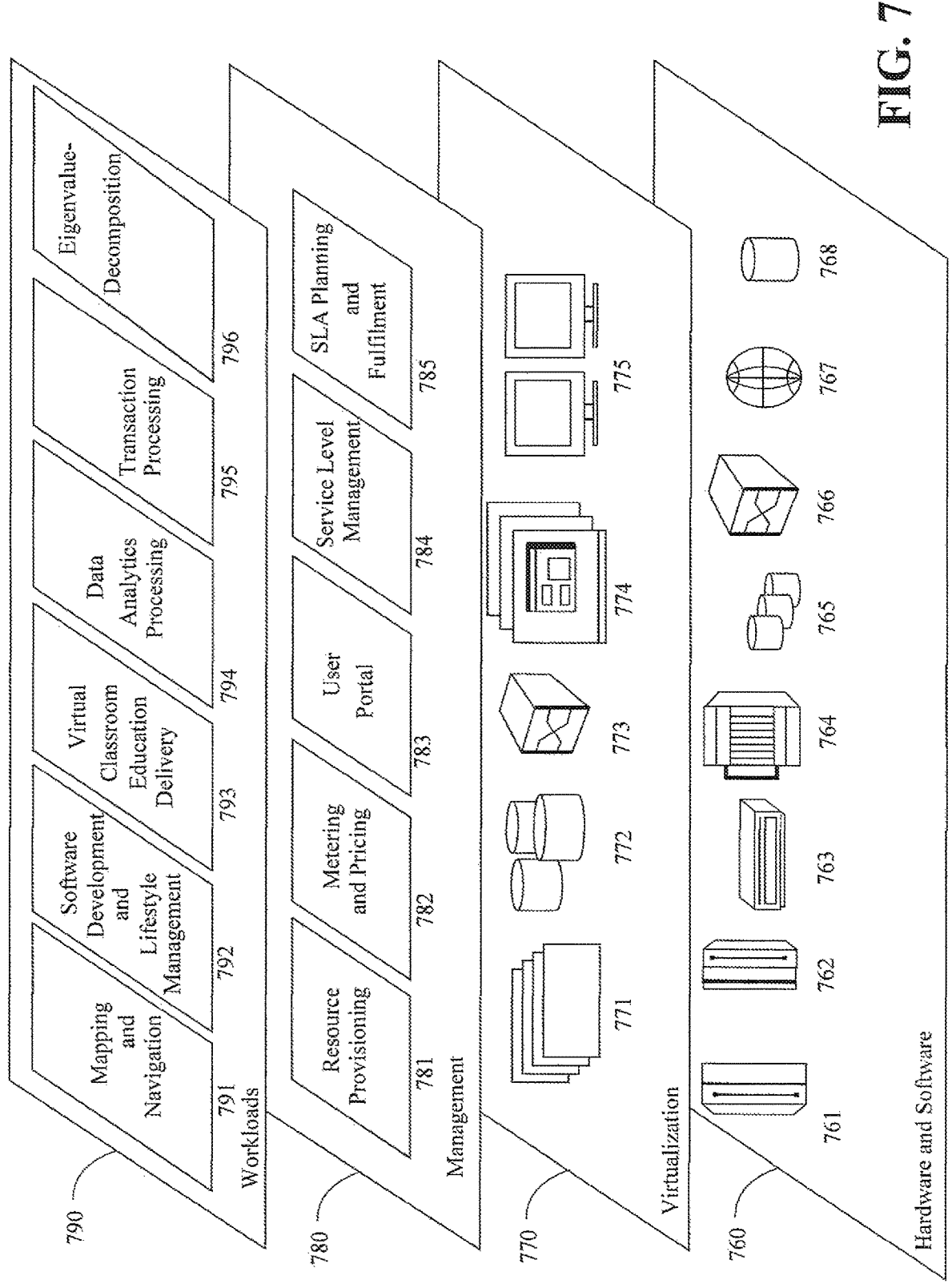
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and Eigenvalue decomposition 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for Eigenpair computation, comprising:
   computing, by a hardware processor, an Eigenvector and respective Eigenvalues of the Eigenvector of a matrix by using a modified Stochastic Optimization process comprising performing a matrix vector product on a Resistive Processing Unit (RPU) crossbar array operatively coupled to the hardware processor and performing a scalar vector product on a digital device operatively coupled to the hardware processor and representing, for each of an Eigenpair, an initial guess for the Eigenvector and the respective Eigenvalues,
   wherein said computing step comprises storing the matrix in the crossbar array.

2. The system of claim 1, wherein the matrix is a symmetric positive definite matrix.

3. The system of claim 1, wherein the modified Stochastic Optimization process is performed over a problem $Ax-\lambda x=0$, where A denotes the matrix stored in the RPU, x denotes the Eigenvector, and $\lambda$ denotes the Eigenvalues.

4. The system of claim 1, wherein the matrix is a non-symmetric indefinite matrix.

5. The system of claim 4, wherein the modified Stochastic Optimization process is performed over a problem $A^TA$, where $A^T$ denotes a transpose of the matrix, and A denotes the matrix.

6. A system for Eigenpair computation, comprising:
   a Resistive Processing Unit (RPU) crossbar array configured to store a matrix of values;
   a hardware processor configured to compute parameters of the matrix by representing, on a digital device operatively coupled to the hardware processor, for each of an Eigenpair, an initial guess for an Eigenvector and respective Eigenvalues of the Eigenvector, and performing a modified Stochastic Optimization process by performing a matrix vector product on the RPU crossbar array and performing a scalar vector product on the digital device,
   wherein the modified Stochastic Optimization process converges responsive to a particular number of Eigenpairs being found by the modified Stochastic Optimization process, and
   wherein subsequent Eigenpairs are obtained by subtracting, from the matrix in an analog outer product update operation, an outer product of a last found Eigenvector in a set of epochs, a transposition of the last found Eigenvector, and a last found Eigenvalue in the set of epochs.

7. The system of claim 6, wherein steps delineated for computing the parameters of the matrix are repeated until the particular number of Eigenpairs is found by the modified Stochastic Optimization process.

8. The system of claim 6, wherein the matrix is a symmetric positive definite matrix.

9. The system of claim 6, wherein the modified Stochastic Optimization process is performed over a problem $Ax-\lambda x=0$, where A denotes the matrix stored in the RPU, x denotes the Eigenvector, and $\lambda$ denotes the Eigenvalues.

10. The system of claim 6, wherein the analog outer product update operation is performed from the matrix updated as $A = A - \lambda xx^t$, wherein A denotes the matrix, $\lambda$ denotes the Eigenvalues, x denotes the Eigenvector, and $x^t$ denotes a transpose of the Eigenvector.

11. The system of claim 6, wherein the matrix is a non-symmetric indefinite matrix.

12. The system of claim 11, wherein the modified Stochastic Optimization process is performed over a problem $A^T A$, where $A^T$ denotes a transpose of the matrix, and A denotes the matrix.

13. The system of claim 6, wherein the hardware processor is further configured to determine a sign value for each of the Eigenvalues by multiplying the matrix by the Eigenvector vector to obtain a product.

14. The system of claim 6, wherein the digital device is a random access memory.

15. The system of claim 6, wherein the subtracting is performed using a pulsing scheme.

16. The system of claim 6, wherein the initial guess for the Eigenvector and the respective Eigenvalues of the Eigenvector is randomly generated.

17. The system of claim 6, wherein the initial guess for the Eigenvector and the respective Eigenvalues of the Eigenvector is generated as a random vector and a random scalar.

18. The system of claim 6, wherein A denotes the matrix, and wherein the modified Stochastic Optimization process converges responsive to an error between Ax and A$\lambda$ being less than a threshold amount, x denotes the Eigenvector and $\lambda$ denotes the respective Eigenvalues of the Eigenvector.

19. A system for Eigenpair computation, comprising:
a Resistive Processing Unit (RPU) crossbar array configured to store a matrix of values; and
a hardware processor, operatively couped to the RPU crossbar array, configured to compute parameters of the matrix by computing an Eigenvector and respective Eigenvalues of the Eigenvector by using a modified Stochastic Optimization process comprising performing a matrix vector product on the Resistive Processing Unit (RPU) crossbar array and performing a scalar vector product on a digital device operatively coupled to the hardware processor and representing, for each of an Eigenpair, an initial guess for the Eigenvector and the respective Eigenvalues.

20. A method for Eigenpair computation, comprising:
configuring a Resistive Processing Unit (RPU) crossbar array to store a matrix of values;
configuring a hardware processor to compute parameters of the matrix by
representing, on a digital device operatively coupled to the hardware processor, for each of an Eigenpair, an initial guess for an Eigenvector and respective Eigenvalues of the Eigenvector; and
performing a modified Stochastic Optimization process by performing a matrix vector product on the RPU crossbar array and performing a scalar vector product on the digital device, wherein the Stochastic Optimization process converges responsive to a particular number of Eigenpairs being found by the Stochastic Optimization process,
wherein subsequent Eigenpairs are obtained by subtracting, from the matrix in an analog outer product update operation, an outer product of a last found Eigenvector in a set of epochs, a transposition of the last found Eigenvector, and a last found Eigenvalue in the set of epochs.

21. The method of claim 20, wherein steps delineated for computing the parameters of the matrix are repeated until the particular number of Eigenpairs is found by the modified Stochastic Optimization process.

22. The method of claim 20, wherein the matrix is a symmetric positive definite matrix.

23. The method of claim 20, wherein the modified Stochastic Optimization process is performed over a problem $Ax - \lambda x = 0$, where A denotes the matrix stored in the RPU, x denotes the Eigenvector, and $\lambda$ denotes the Eigenvalues.

24. The method of claim 20, wherein the analog outer product update operation is performed from the matrix updated as $A = A - Axx^T$, wherein A denotes the matrix, A denotes the Eigenvalues, x denotes the Eigenvector, and $x^T$ denotes a transpose of the Eigenvector.

25. The method of claim 20, further comprising determining a sign value for each of the Eigenvalues by multiplying the matrix by the Eigenvector vector to obtain a product.

* * * * *